(12) United States Patent
Oh (10) Patent No.: US 6,778,551 B1
(45) Date of Patent: Aug. 17, 2004

(54) COLLISION CONTROL SYSTEMS AND METHODS UTILIZING AN INTER-FRAME GAP CODE COUNTER

(75) Inventor: Soon-Seok Oh, Kyungki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/422,622

(22) Filed: Oct. 21, 1999

(30) Foreign Application Priority Data

Oct. 29, 1998 (KR) .......................................... 98-45711

(51) Int. Cl.[7] ................................................. H04J 3/02
(52) U.S. Cl. .................................................... 370/445
(58) Field of Search ................................ 370/440–446, 370/458, 478–480, 503, 395, 342, 474, 331–338, 438, 426, 408, 419–421, 463, 315, 469, 399, 235–229; 375/272, 118, 242, 745; 455/86; 709/220–224; 320/392, 402, 517, 504, 528

(56) References Cited

U.S. PATENT DOCUMENTS

| | | | | |
|---|---|---|---|---|
| 4,785,396 A | * | 11/1988 | Murphy et al. | ............. 370/447 |
| 5,020,081 A | * | 5/1991 | Allen et al. | ................. 375/118 |
| 5,375,070 A | * | 12/1994 | Hershey et al. | ............. 709/224 |
| 5,577,069 A | * | 11/1996 | Lau et al. | ................... 375/242 |
| 5,604,867 A | * | 2/1997 | Harwood | ..................... 709/233 |
| 5,825,755 A | * | 10/1998 | Thompson et al. | ......... 370/296 |
| 5,940,399 A | * | 8/1999 | Weizman | ..................... 370/445 |
| 6,067,297 A | * | 5/2000 | Beach | ......................... 370/389 |
| 6,075,787 A | * | 6/2000 | Bobeck et al. | ............. 370/395 |
| 6,222,825 B1 | * | 4/2001 | Mangin et al. | ............. 370/235 |

* cited by examiner

*Primary Examiner*—Chi Pham
*Assistant Examiner*—Prenell Jones
(74) *Attorney, Agent, or Firm*—Myers Bigel Sibley & Sajovec (57) ABSTRACT

Ethernet collision control systems and methods for an ethernet network are provided which utilize a media access controller (MAC) which inserts a counter code in the inter-frame gap (IFG) between frame units when transmitting data of a data size which exceeds the capacity of a single frame of the ethernet protocol. The counter code provides a clock signal which may be received by other hosts on the network when they monitor the network to determine whether they are able to make transmissions. First, by recognizing the counter code between frames as distinguished from an idle period signal, the hosts seeking to transmit are notified that additional frames are expected in the next time window from the currently transmitting host. In addition, a counter is provided on each host which generates a count value from the received counter code received during inter-frame gaps and generates a retransmission criterion for controlling transmissions based on the received counter code. Accordingly, a counter code may be used to prioritize access to the network based upon the sequence with which additional hosts wishing to transmit data access the network responsive to an internally generated transmission request.

21 Claims, 4 Drawing Sheets

COLLISION CONTROL SYSTEMS AND METHODS UTILIZING AN INTER-FRAME GAP CODE COUNTER

FIELD OF THE INVENTION

The present invention relates to ethernet networks. More specifically, the present invention relates to collision protocols for ethernet networks.

BACKGROUND OF THE INVENTION

Communication networks such as computer networks are increasingly used in interconnecting a plurality of computers each of which independently executes tasks while communicating information over the network for shared use. The volume of information which may be transferred over such networks has increasingly become more demanding on the structure of the networks themselves. Various network devices are known to allow the connection of a greater number of computers to a single network and further to allow more free communication of information between computers or other devices on the network or on other interconnected networks. As the number of devices on networks increases, the demands for high performance repeaters and other devices to meet the challenge of managing the information flow so that the data does not create a bottleneck effect on the network are increasingly required. Furthermore, the protocol supporting communications over such networks are typically evolving to support higher data rates and larger volumes of information transmittal over the communication networks.

One example of such a communication protocol is known as the ethernet protocol as defined by the Institute of Electrical and Electronic Engineers (IEEE) 802.3 standard. The ethernet protocol is one of the most widely implemented local area network (LAN) standards. An updated version of the ethernet protocol, fast ethernet, is specified to support data transfer rates of 100 megabits per second (Mb/s). A further version, gigabit ethernet, is specified as supporting data rates of 1,000 Mb/s. The developments in the standard related to such technical progress in general have been based on the physical layer, i.e., on the lowest or first layer of an open system interconnection (OSI). While developments and commercialization of faster physical layers has progressed, the protocols for the media access controllers (MAC) currently used in ethernet networks have seen relatively little change.

One problem encountered with ethernet as a result of the increasing performance of personal computers and the number of hosts using a single network, thereby creating increased volumes of traffic on the network, is that difficulties may occur using carrier sense multiple access/collision detection (CSMA/CD) methods such as those provided by ethernet for conventional MAC protocols. A CSMA/CD type host (terminal/computer) generally checks carriers on a transmission path of the network before transmitting frames. The host then transmits a frame during what appears to the host to be an idle period on the transmission path. However, such networks allow collisions to occur when two different connected hosts both attempt to transmit frames on the network at the same time. When the collision is detected, the ethernet protocol provides for collision recovery steps including stopping transmission of any remaining parts of a frame currently being transmitted and initiating retransmission of transmission frames which encounter the collision after some time interval which is typically specified by the collision detection recovery protocol in use on the network.

More particularly, when two transmissions of data collide, collision signals with predetermined bits indicating a collision may be transmitted to each host involved in the transmissions which collided. On receiving the collision signals, the host terminals may retransmit the data. The timing of retransmission is typically controlled using a retransmitting algorithm such as a binary exponential backoff (BEB) algorithm. The BEB algorithm generally specifies "2" as a common small constant factor by which the time between making retransmission attempts is increased for each subsequent attempt.

For example, when a host A transmits data on the network and a first collision occurs, a retransmission may be attempted after a single minute. If, during the first retransmission attempt by host A, a second collision occurs, another retransmission is attempted after two minutes. If a third collision occurs at this point, another retransmission is attempted after four minutes and so on.

One problem with this type of BEB algorithm is fairness to competing hosts attempting to access the communication channel. For example, assuming that host A attempts a retransmission after four minutes delay when a third subsequent collision occurs, a separate host, host B may transmit data while host A is delayed waiting a specified time period for a subsequent retransmission attempt. If no collision is encountered by host B during its transmission, it will have transmitted its data prior to host A even though "fairness" would dictate that host A be allowed to transmit data prior to host B as host A sought to transmit such data in advance of the request by host B. In other words, when the BEB algorithm is used, it is possible for a host which attempted to transmit data later than another host to transmit data first. This problem is generally referred to as a capture effect and reduces network performance. The capture effect is generally an intrinsic problem when utilizing the CSMA/CD method and may worsen when the number of hosts in a network is sharply increased or when a larger amount of data is transmitted over a network.

In an attempt to solve this problem various algorithms have been developed as modifications over the BEB algorithm. One such algorithm is the capture avoidance binary exponential backoff (CABEB) algorithm. Another is the binary logarithmic arbitration method (BLAM) algorithm. These algorithms are based on the BEB algorithm and may allow for improved methods for calculating the delay times while still facilitating prevention of collisions. However, the CABEB and BLAM algorithms are still subject to the problem of a lack of fairness in access to the network resource.

In a further aspect of operation of ethernet networks, when signal collisions occur in hubs or repeaters in the network, a collision truncation method which detects collisions and transmits collision signals to a host can be used. This method may reduce the delay time required for collision signals to be transmitted to the respective host so that there is less reduction in the performance of the network. Although this method may improve network performance, the problems of collision and unfairness may still exist.

Accordingly, conventional methods for collision detection and recovery create problems in fairness and may often times result in the reduction of the performance of a network. Furthermore, when the traffic load on a network is sharply increased, the data to be transmitted may surpass a maximum transmission time such that information is not successfully transmitted and is lost. Typically, such problems can only be solved in upper layers of the communication hierarchy which may adversely impact the total performance of the communications over the network.

SUMMARY OF THE INVENTION

It is, therefore, an object of the present invention to provide systems and methods for collision control on an ethernet network which may decrease the likelihood of collisions.

It is a further object of the present invention to provide systems and methods for collision control on an ethernet network which may reduce capture effect and provide for improved fairness in access to the network.

In order to provide for the foregoing and other objectives, ethernet collision control systems and methods for an ethernet network are provided which utilize a media access controller (MAC) which inserts a counter code in the inter-frame gap (IFG) between frame units when transmitting data of a data size which exceeds the capacity of a single frame of the ethernet protocol. The counter code provides a clock signal which may be received by other hosts on the network when they monitor the network to determine whether they are able to make transmissions. First, by recognizing the counter code between frames as distinguished from an idle period signal, the hosts seeking to transmit are notified that additional frames are expected in the next time window from the currently transmitting host. In addition, a counter is provided on each host which generates a count value from the received counter code received during inter-frame gaps and generates a retransmission criterion for controlling transmissions based on the received counter code. Accordingly, a counter code may be used to prioritize access to the network based upon the sequence with which additional hosts wishing to transmit data access the network responsive to an internally generated transmission request.

In one embodiment of the present invention, A collision control system for an ethernet network is provided including a media access controller (MAC) circuit that provides data for transmission in frame units. The MAC circuit further includes a code generator that generates a counter code that is transmitted in an inter-frame gap (IFG) between frame units. The counter code is distinct from an idle period code specified by the ethernet network. Also included in the collision control system is a transmitter coupling the MAC circuit to the ethernet network that transmits the frame units and the counter code on the ethernet network.

In another embodiment of the present invention, the collision control system further includes a receiver coupling the MAC circuit to the ethernet network that receives transmissions from the ethernet network including frame units and counter codes transmitted by other collision control systems coupled to the ethernet network. In this embodiment, the MAC circuit further includes a counter for generating a transmission criterion responsive to the received counter codes. The counter code may include a start-period, a clock period. The counter may generate a transmission criterion responsive to the clock period. In one embodiment, the clock period includes a plurality of clock signals and the counter generates a counter value responsive to the plurality of clock signals, the counter value specifying a priority for use as the transmission criterion. In addition, the counter code may further include an end period and the counter may be initialized by the start period and count the plurality of clock signals until the end period is received. The MAC circuit may be configured to use the counter value as a coefficient of a binary exponential backoff (BEB) algorithm to control transmission by the transmitter.

In a further aspect of the present invention, a collision control system for an ethernet network is provided including a receiver coupled to the ethernet network that receives transmissions from the ethernet network including frame units and a counter code transmitted by other collision control systems coupled to the ethernet network and a media access controller (MAC) that receives data in frame units and counter codes from the receiver. The MAC circuit includes a counter for generating a transmission criterion responsive to the received counter code.

In yet another aspect of the present invention, methods are provided for collision control for an ethernet network. Frames of data and a received counter code are received from the ethernet network. The received counter code is received between a first and a second of the frames of data. The received counter code is analyzed to determine a transmission criterion and frames of data are transmitted responsive to the transmission criterion. In one embodiment, transmitting operations include generating a plurality of frames of data for transmission, generating a transmit counter code and transmitting the plurality of frames of data on the ethernet network with the transmit counter code inserted in an inter-frame gap (IFG) between each of the plurality of frames responsive to the transmission criterion.

In one embodiment of the method aspects of the present invention, the received counter code comprise a start period and a clock period including a plurality of clock signals and the analyzing operations include generating a counter value responsive to the plurality of clock signals, the counter value specifying a priority for use as the transmission criterion. The plurality of frames of data may be transmitted at a time determined using the counter value as a coefficient of a binary exponential backoff (BEB) algorithm. In one embodiment, the received counter code further includes an end period and a counter value is generated by initializing the counter responsive to the start period, counting the plurality of clock signals and stopping the counting step and setting the counter value responsive to the end period.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods or devices. Accordingly, the present invention may take the form of a hardware embodiment, a software embodiment or an embodiment combining software and hardware aspects.

Figure 1:
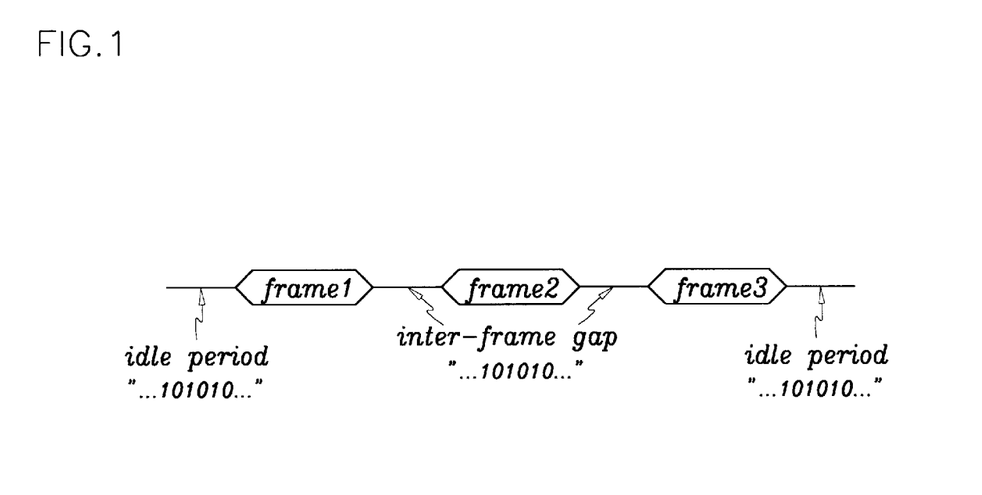
FIG. 1 is a schematic illustration of ethernet frame transmissions in a high speed (fast) ethernet network.

Referring to the schematic illustration of FIG. 1, framed transmissions in a fast ethernet network will now be described. Such networks have idle periods, frames and inter-frame gaps (IFG) occurring between frames. In the idle periods, no data is transmitted over the network. In the illustrated schematic of FIG. 1, data to be transmitted over the network is divided up across three frames, frame1, frame2 and frame3, which are transmitted over the network. The IFGs are located between frame1 and frame2 and between frame2 and frame3. With the frame structure illustrated in FIG. 1, the codes representing the idle periods are generally identical with those representing the IFGs. Accordingly, a host seeking to make a transmission on the network detects what it recognizes as idle available period indicators in the idle periods or the IFGs and then subsequently attempts to transmit data.

Figure 2:
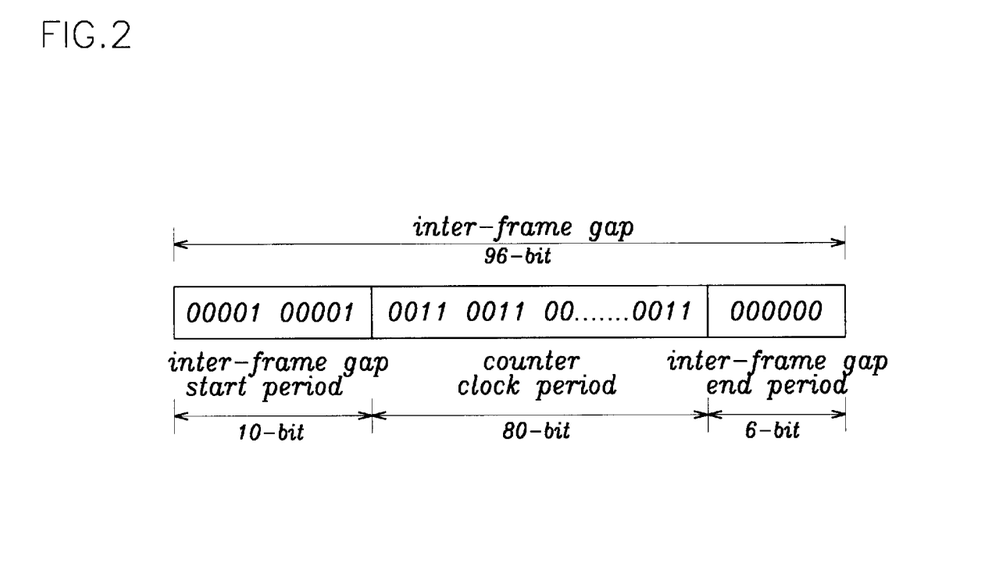
FIG. 2 is a schematic illustration of an inter-frame gap according to an embodiment of the present invention.

In order to control and potentially prevent data collisions, the apparatus and methods of the present invention provide for specific codes (counter codes) during the IFGs which allow idle periods to be distinguished from the IFGs. Furthermore, improved BEB algorithms for retransmission are provided which beneficially utilize the counter codes provided during the IFGs. Referring now to FIG. 2, an embodiment of the present invention will be further described with reference to the schematic illustration of an IFG providing a counter code. As shown in FIG. 2, the length of the IFG is 96 bits. The corresponding counter code includes a 10 bit IFG start period in the first 10 bits (shown as 00001 0001). The following 80 bits provide a clock period which represents clock signals (shown as a repeating pattern of "0011 0011"). Finally, a 6 bit duration IFG end period is appended at the end of the counter clock period. In the illustrated embodiment of FIG. 2, the clock signals and the clock period are set to repeat a "0011 0011" pattern which, within the 80 bit clock period, provides an actual maximum clock cycle count of 20. This clock cycle amount (20) is sufficient to satisfy the requirements of the maximum retransmission trial amount count of 16 for the BEB algorithm generally recommended by the IEEE 802.3 standard.

Figure 3:
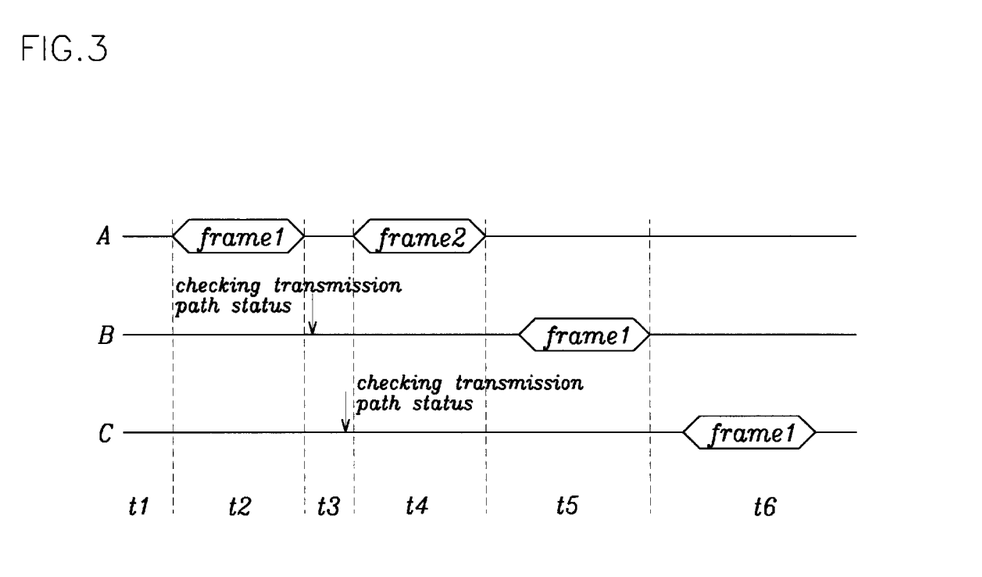
FIG. 3 is a schematic illustration of frame transmissions in a high speed ethernet network according to an embodiment of the present invention.

FIG. 3 is a schematic illustration of frame transmissions in a fast ethernet network according to an embodiment of the present invention. As shown in FIG. 3, three hosts, A, B, and C are coupled to the network and, at various times, attempt data transmission over the network. Host A checks the status of the transmission path of the network at time t1. Because the status of the transmission path is detected as idle by host A, host A starts to transmit data during period t2. In the illustrated example of FIG. 3, the total data to be transmitted by host A exceeds the capacity of a single frame and is, therefore, divided into two frames, frame1 and frame2. Frame1 is transmitted during period t2 and the IFG counter code is transmitted during the time period t3 between frame1 and frame2. Frame2 is then transmitted during the subsequent period t4. Host A, after completing transmission of the data, may repeatedly transmit during period t5 the code "101010. . . " representing an idle period.

As shown in FIG. 3, during time period t3 host B and then, shortly there after, host C, check the transmission path to determine if they are able to transmit data during period t3. As noted previously in reference to FIG. 1, for the conventional method of FIG. 1, host B and C would both read the idle period code "101010. . . " during their check of the transmission path and, accordingly, would simultaneously attempt to transmit data during period t4, thereby causing a collision to occur. However, pursuant to the apparatus and methods of the present invention, both hosts B and C receive the counter code corresponding to the IFG period when checking the status of the transmission path during period t3. Accordingly, they receive the clock signals provided during the counter clock period which are used by both host B and host C to operate internal counters for use in generating a transmission criterion for the respective hosts. As will be described further herein, because host B checked the transmission path and detected the counter code during the IFG some time period prior to host C, host B's counter will generate a counter value greater than that generated by the counter of host C. This greater count will generate respective transmission criteria causing host B to transmit its frame of data during time period t5 while host C waits for time period t6.

For example, a counter value may be used to generate a coefficient for use in a BEB algorithm that varies depending upon the counter value. More particularly, the counter of host B may provide a coefficient resulting in a shorter delay for transmission than that provided by host C based on the greater value of the count calculated by host B during reading of the counter code during period t3. Alternatively, a delay period within time period t5 immediately following completion of frame transmission by host A may be inversely related to the count generated during time period t3 and each of host B and host C may be required to check transmission path status before beginning transmissions. Accordingly, host B will begin transmission of its frame thereby resulting in a non-idle period indication on the transmission path when host C subsequently checks the transmission path at its designated delay after the end of time period t4. Accordingly, host C will need to wait an additional time period after the transmission of a frame by host B before it encounters, during time period t6, an idle period indication at its check time before transmission of its frame. Accordingly, multi-framed transmissions may be successfully provided without collisions from the individual host and the sequencing of competing additional hosts accessing the network following completion of transmissions by a first host may be provided while avoiding the occurrence of collisions on the network.

The BEB algorithm for collision control as provided by the IEEE 802.3 standard is as follows:

$$0 \leq r < 2^k$$

where k=min (n, 10), and, according to the IEEE 802.3 standard, the value of n is "1" for both hosts B and C. Accordingly, host B and C, having identical n values, may use their counter value to determine which host has the transmission priority. As in the illustrated example of FIG. 3 host B has a greater counter value than host C, host B has the higher priority and, after host A completes data transmission, host B starts to transmit data during time period t5. Host C subsequently transmit data during time period t6.

Figure 4:
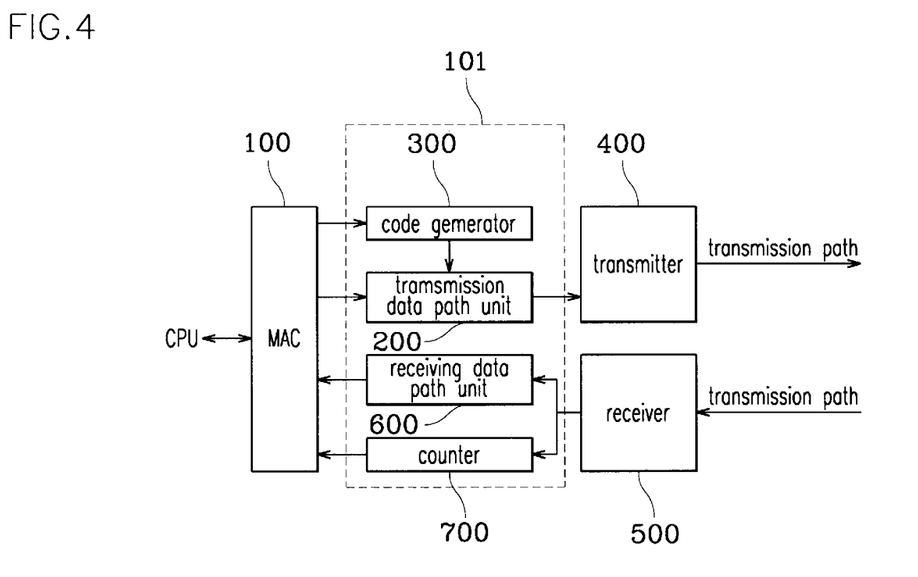
FIG. 4 is a block diagram of a collision control system according to an embodiment of the present invention.

An embodiment of a collision control system for an ethernet network will now be further described with reference to the block diagram of FIG. 4. As shown in the embodiment of FIG. 4, the collision control system includes a media access controller (MAC) 100, a transmission data path unit 200, a code generator 300, a transmitter 400, a receiver 500, a receiving data path unit 600 and a counter 700. The MAC 100, the transmission data path unit 200, the code generator 300, the receiving data path unit 600 and the counter 700 comprise a MAC circuit 101.

The MAC 100 illustrated in the embodiment of FIG. 4 generates data and manages communications with the ethernet network pursuant to the IEEE 802.3 standard including generating data for transmission in frame units and receiving transmissions from the ethernet network in frame units. The transmitter 400 is a physical layer coupling unit which converts transmission data into electrical signals in a suitable form for transmitting the electrical signals over the transmission path of the network. Accordingly, the transmitter 400 couples the MAC circuit 101 to the ethernet network and transmits frame units on the ethernet network. Similarly, the receiver 500 provides a physical layer coupling unit which receives electrical signals from the transmission path and transforms the signals into a data format suitable for providing to the MAC circuit 101.

The transmission data path unit 200 located between the MAC 100 and the transmitter 400 provides the data from the MAC 100 to the transmitter 400. The code generator 300 generates the specific counter codes, such as those illustrated in the embodiment of FIG. 2, for insertion into the IFG between data frames for transmission over the network. Accordingly, the transmission data path unit 200 provides an appropriate data stream including frames containing data for transmission as well as counter codes in the IFG period between frames of a multiple frame transmission of data.

The receiving data path unit 600 which is coupled between the receiver 500 and the MAC 100 provides data received by the receiver 500 via the transmission path of the ethernet network to the MAC 100. In addition, the counter 700 is configured to detect the start period of the counter code in the IFG and perform counter operations on the clock signals contained in the counter clock. More particularly, the counter may be initialized responsive to detection of the start period and then count a plurality of clock signals received until the end period signal is received by the counter 700 from the receiver 500. The counter value so generated may then be provided to the MAC 100 for use in establishing a transmission criterion controlling subsequent transmissions.

Figure 5:
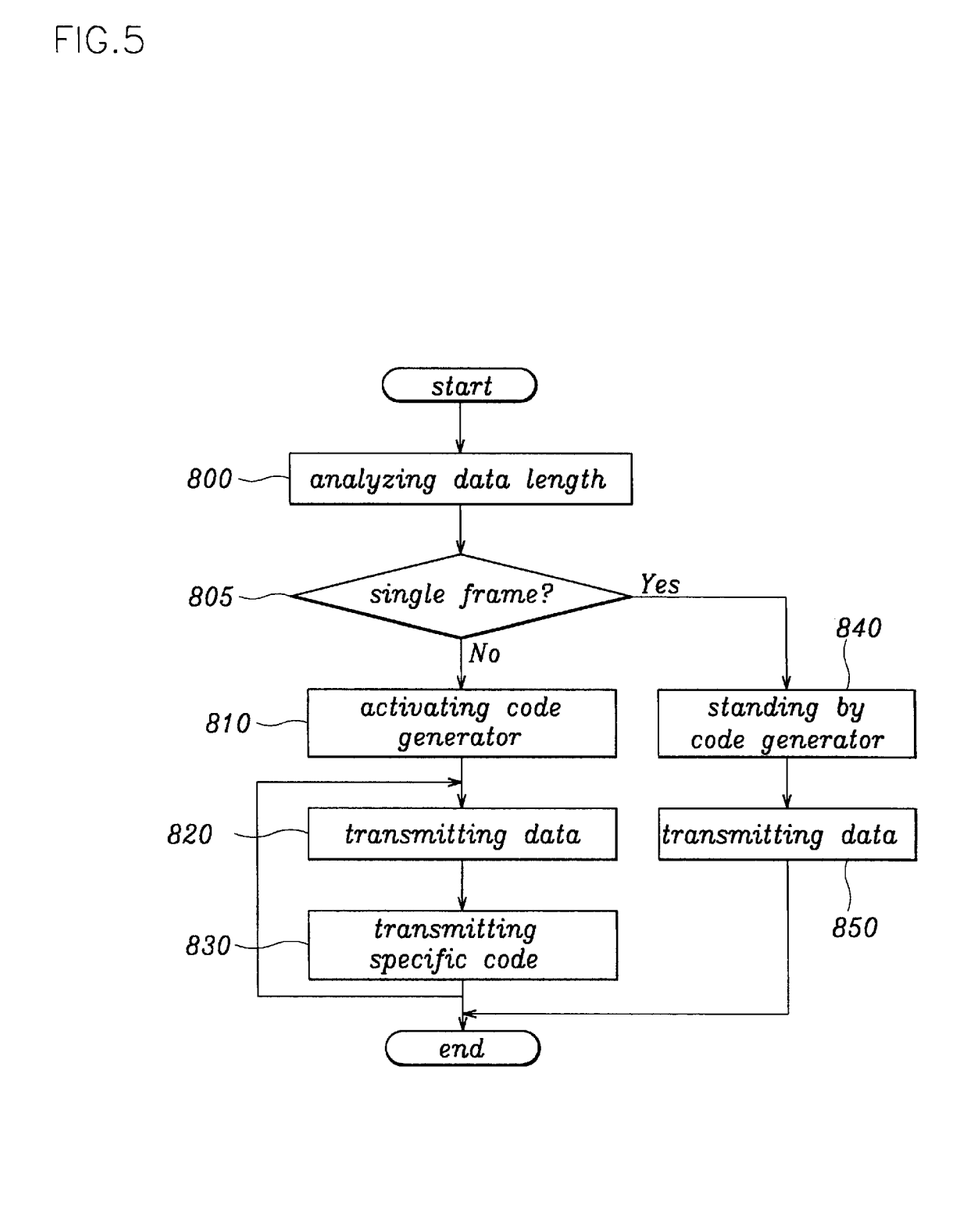
FIG. 5 is a flow chart illustrating frame transmission according to an embodiment of the present invention.

Operations according to an embodiment of the present invention will now be further described with reference to the flow chart illustration of FIG. 5. FIG. 5 illustrates operations related to frame transmission. Operations begin at block 800 when the MAC 100 generates data to be transmitted and analyzes the data length to determine whether the data may be transmitted as a single frame or must be transmitted as multiple frames. Where more than a single frame are required to support transmission of the data (block 805), the code generator 300 is activated (block 810). Subsequently, a first frame is transmitted containing a portion of the data which has been divided across a plurality of frames (block 820). The code generator 300 then provides a counter code to the transmission data path unit 200 for transmission by the transmitter 400 during the IFG (block 830). Operations of block 820 and 830 repeat for the remainder of the plurality of frames containing the data for transmission.

Where only a single frame is required for the data transmission (block 805), the code generator 300 is maintained in a standby mode (block 840). The data from the MAC 100 is then transmitted in a single frame by the transmitter 400 as the data is received from the data transmission path unit 200 (block 850).

Figure 6:
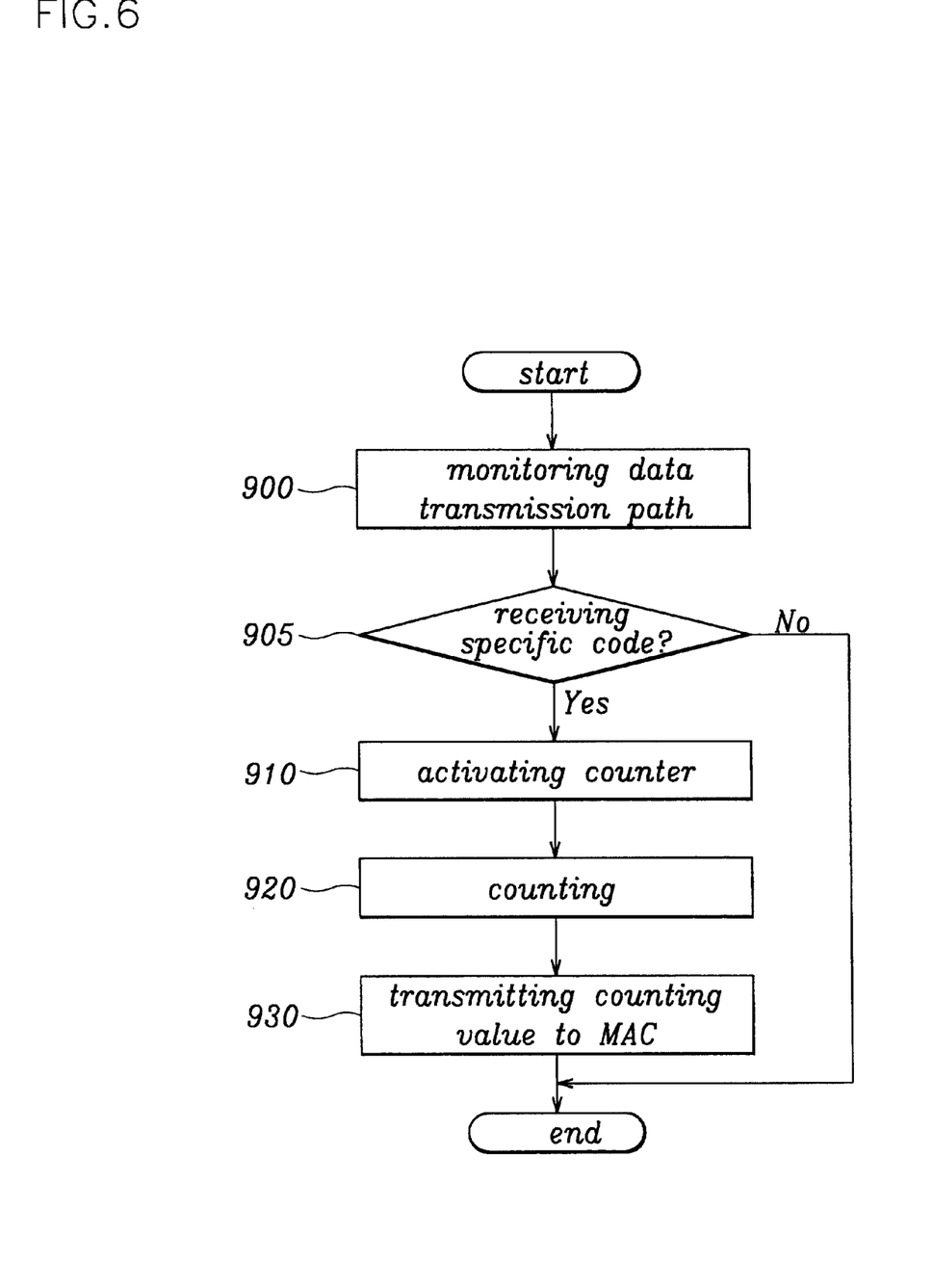
FIG. 6 is a flow chart illustrating receiving operations according to an embodiment of the present invention.

Referring now to FIG. 6 operations according to an embodiment of the present invention will now be further described with reference to the flow chart illustration of receiving operations. As shown on FIG. 6 operations begin with a host computer (collision control system for an ethernet network) monitoring the transmission path of the ethernet network to determine whether the host may transmit data (block 900). If the host receives an IFG associated counter code such as that illustrated in FIG. 2 (block 905), the counter 700 is initialized and activated (block 910). The counter 700 then performs counting operations responsive to the clock signals contained in the counter code clock period (block 920). On receipt by the counter of the end period of the IFG counter code, counter operations are stopped and the respective counter value is provided to the MAC 100 by the counter 700 (block 930). The MAC 100 then determines transmission priorities using the counter value as a transmission criterion. Each respective host monitoring the network accordingly retransmits (or transmits) data responsive to the determined priorities.

As described above, the present invention provides for the use of a counter code which is generated during the IFG and which is received and counted by a counter operating responsive to clock signals contained in a clock period of the counter code. Resulting counter values determined during checking of the transmission path prior to transmissions are transmitted to the MAC 100 which may thereby provide for reduction or prevention of delays in utilization of the network by MAC attempts to retransmit data and may further reduce the potential for overwhelming of the network by data from a particular transmitting host. Furthermore, fairness between transmission opportunities by various hosts which occupy the transmission path after a collision and hosts which did not occupy the transmission path may also be maintained.

As will be appreciated by those of skill in this art, the above-described aspects of the present invention in FIGS. 4–6 may be provided by hardware, software, or a combination of the above. While various components of the MAC circuit 101 have been illustrated in FIG. 4, in part, as discrete elements, they may, in practice, be implemented by a processor, such as a microcontroller, including input and output ports and running software code, by custom or hybrid chips, by discrete components or by a combination of the above. For example, the code generator 300 may be contained within a processor (not shown) supporting other functions of the MAC 100.

Operations of the present invention have been described above with reference to the flow chart and schematic block diagrams of FIGS. 4–6. It will be understood that each block of the flowchart illustrations and/or block diagrams and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart and/or block diagram block or blocks. The computer program instructions may be executed by a processor to cause a series of operational steps to be performed by the processor to produce a computer implemented process such that the instructions which execute on the processor provide steps for implementing the functions specified in the flowchart and/or block diagram block or blocks.

Accordingly, blocks of the flowchart illustrations and block diagrams support combinations of means for performing the specified functions, combinations of steps for performing the specified functions and program instruction means for performing the specified functions. It will also be understood that each block of the flowchart illustrations and/or block diagrams, and combinations of blocks in the flowchart illustrations and/or block diagrams, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A collision control system for an ethernet network comprising:
   a media access controller (MAC) circuit that provides data for transmission in frame units, the MAC circuit further including a code generator that generates a counter code that is transmitted in an inter-frame gap (IFG) between frame units, the counter code being distinct from an idle period code specified by the ethernet network; and
   a transmitter coupling the MAC circuit to the ethernet network that transmits the frame units and the counter code on the ethernet network.

2. The system of claim 1 further comprising:
   a receiver coupling the MAC circuit to the ethernet network that receives transmissions from the ethernet network including frame units and counter codes transmitted by other collision control systems coupled to the ethernet network; and
   wherein the MAC circuit further comprises a counter for generating a transmission criterion responsive to the received counter codes.

3. The system of claim 2 wherein the counter code comprises:
   a start period;
   a clock period; and
   wherein the counter generates a transmission criterion responsive to the clock period.

4. The system of claim 3 wherein the clock period comprises a plurality of clock signals and wherein the counter generates a counter value responsive to the plurality of clock signals, the counter value specifying a priority for use as the transmission criterion.

5. The system of claim 4 wherein the counter code further comprises an end period and wherein the counter is initialized by the start period and counts the plurality of clock signals until the end period is received.

6. The system of claim 5 wherein the MAC circuit is configured to use the counter value as a coefficient of a binary exponential backoff (BEB) algorithm to control transmission by the transmitter.

7. A collision control system for an ethernet network comprising:
   a receiver coupled to the ethernet network that receives transmissions from the ethernet network including frame units and a counter code transmitted by other collision control systems coupled to the ethernet network, the counter code being received in an inter-frame gap (IFG) between ones of the frame units; and
   a media access controller (MAC) circuit that receives data in frame units and counter codes from the receiver, the MAC circuit further including a counter for generating a transmission criterion responsive to the received counter code.

8. The system of claim 7 wherein the counter code comprises:
   a start period;
   a clock period; and
   wherein the counter generates a transmission criterion responsive to the clock period.

9. The system of claim 8 wherein the clock period comprises a plurality of clock signals and wherein the counter generates a counter value responsive to the plurality of clock signals, the counter value specifying a priority for use as the transmission criterion.

10. A collision control system for an ethernet network comprising:
    a receiver coupled to the ethernet network that receives transmissions from the ethernet network including frame units and a counter code transmitted by other collision control systems coupled to the ethernet network;
    a media access controller (MAC) circuit that receives data in frame units and counter codes from the receiver, the MAC circuit further including a counter for generating a transmission criterion responsive to the received counter code;
    wherein the counter code comprises a start period and a clock period;
    wherein the counter generates a transmission criterion responsive to the clock period;
    wherein the clock period comprises a plurality of clock signals;
    wherein the counter generates a counter value responsive to the plurality of clock signals, the counter value specifying a priority for use as the transmission criterion; and
    wherein the MAC circuit is configured to use the counter value as a coefficient of a binary exponential backoff (BEB) based algorithm to control transmission by the transmitter.

11. A method for collision control for an ethernet network comprising the steps of:
    receiving frames of data and a received counter code from the ethernet network, the received counter code being received between a first and a second of the frames of data;
    analyzing the received counter code to determine a transmission criterion; and
    transmitting frames of data responsive to the transmission criterion.

12. The method of claim 11 wherein the transmitting step comprises the steps of:
    generating a plurality of frames of data for transmission;
    generating a transmit counter code; and
    transmitting the plurality of frames of data on the ethernet network with the transmit counter code inserted in an inter-frame gap (IFG) between each of the plurality of frames responsive to the transmission criterion.

13. The method of claim 12 wherein the received counter code comprise a start period and a clock period including a plurality of clock signals and wherein the analyzing step comprises the step of generating a counter value responsive to the plurality of clock signals, the counter value specifying a priority for use as the transmission criterion.

14. The method of claim 13 wherein the step of transmitting the plurality of frames of data is performed at a time determined using the counter value as a coefficient of a binary exponential backoff (BEB) algorithm.

15. The method of claim 13 wherein the received counter code further comprises an end period and wherein the step of generating a counter value comprises the steps of:

initializing a counter responsive to the start period;

counting the plurality of clock signals; and stopping the counting step and setting the counter value responsive to the end period.

16. A collision preventing apparatus comprising a media access controller (MAC) and a physical contact unit in fast ethernet, wherein the MAC is configured to generate a specific code at an inter-frame gap (IFG) between frames, that distinguishes an idle period from the IFG, when the MAC transmits a plurality of frames to transmission paths through the physical contact unit, and wherein the specific code comprises:

a start period representing a start of the IFG;

a clock period providing clock signals following the start period; and an end period representing an end of the IFG following the clock period.

17. A collision preventing apparatus comprising a media access controller (MAC) and a physical contact unit in fast ethernet, wherein the MAC is configured to generate a specific code at an inter-frame gap (IFG) between frames, that distinguishes an idle period from the IFG, when the MAC transmits a plurality of frames to transmission paths through the physical contact unit, and further comprising a counter that is initialized by the start period, and wherein the clock period is counted by the clock signals, and wherein the counting of the clock period is ended in the end period, and wherein a resulting counter value generated by counting the clock period is used to determine priorities of data transmission.

18. In a collision preventing apparatus comprising a media access controller (MAC) and a physical contact unit in fast ethernet, the MAC generates a specific code at an inter-frame gap (IFG) between frames in order to distinguish an idle period from the IFG when the MAC transmits a plurality of frames to transmission paths through the physical contact unit, wherein the specific code comprises:

a start period representing the start of the IFG;

a clock period providing clock signals to operate a clock; and an end period representing the end of the IFG;

wherein the counter is initialized by the start period, and the clock period is counted by the clock signals, and the counting operation is ended in the end period, a resulting counter value being used to determine priorities of data transmission; and wherein the counter value is used as a coefficient of a binary exponential backoff (BEB) algorithm.

19. A collision preventing method in fast ethernet, comprising the steps of:

(a) generating data to be transmitted, and forming frames according to data length;

(b) determining whether to transmit the data in a single frame;

(c) in case of transmitting the data in more than a single frame, transmitting a first frame among a plurality of frames, and transmitting a specific code to an inter-frame gap (IFG); and (d) in case of transmitting the data in a single frame, transmitting the single frame.

20. The method of claim 19, wherein step (c) is repeated until all the data are transmitted.

21. The method of claim 20, wherein the method further comprises the steps of:

(e) monitoring transmission paths for a host to transmit data;

(f) performing counting operations according to clock signals of the specific code and outputting a counter value when the host receives the specific code from the IFG; and (g) determining priorities according to the counter value, and retransmitting the data according to the priorities by the host.

\* \* \* \* \*